UNITED STATES PATENT OFFICE.

FRANZ VON KÜGELGEN AND GEORGE O. SEWARD, OF HOLCOMBS ROCK, VIRGINIA, ASSIGNORS, BY MESNE ASSIGNMENTS, TO TIN PRODUCTS COMPANY, A CORPORATION OF NEW YORK.

DETINNING.

No. 853,461.      Specification of Letters Patent.      Patented May 14, 1907.

Application filed August 3, 1905. Serial No. 272,453.

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Detinning, of which the following is a specification.

In our application for patent filed January 16, 1904, Serial No. 189,272, we have described a process of detinning especially applicable to the recovery of tin from tin scrap. Said process, broadly described, consists in treating the tin scrap with dry chlorin gas in closed vessels, thus obtaining liquid stannic chlorid, which mostly collects in the bottom of the vessel and can be removed by gravity. It is not, however, all so removed, and a film of it remains adhering to the detinned scrap. It is absolutely necessary to remove this adhering stannic chlorid before the tanks can be opened with safety to the operator, as it produces choking fumes upon contact with the air; the present invention relates particularly to the method of removing such anhydrous stannic chlorid from the detinning tank. This removal is accomplished in the following manner:—After the reaction is complete, and the tin in the tank has all been converted into stannic chlorid, which has been removed as much as possible by gravity from the bottom of the tank, we continue to pass dry chlorin through the tank, which now contains scrap free from metallic tin, but with a certain amount of stannic chlorid adhering to it. Chlorin has the capacity of absorbing a great quantity of stannic chlorid, and by availing of this property we thus get rid of the remainder of the stannic chlorid so that it is taken up by the chlorin and passes out of the tank with it. The operation might be likened to the drying of a damp vessel by passing dry air through it. When all the stannic chlorid is thus removed, the chlorin is driven out by a current of air, after which the tank may be safely opened for the removal of the detinned scrap. It has been found of advantage to pass the air, used to replace the chlorin, through a mass of heated iron filings, in order to remove the oxygen therefrom, but this is not absolutely necessary. The stannic chlorid and chlorin, which are thus successively removed from the tank after the completion of the detinning, are passed into other tanks containing fresh quantities of scrap, and so utilized.

Though we have described with great particularity of detail certain embodiments of the invention, yet it will be understood that modifications thereof may be made by those skilled in the art without departure from the invention.

What we claim is:—

1. The process which consists in detinning by passing dry chlorin over tin scrap and after the detinning is complete removing the residual anhydrous stannic chlorid from the detinning vessel by passing chlorin therethrough, and finally expelling the chlorin from the vessel.

2. The process which consists in detinning by subjecting tin scrap to the action of dry chlorin at a temperature below that at which stannic chlorid volatilizes, and subsequently removing the residual stannic chlorid from the detinning vessel by passing chlorin therethrough.

3. The process of removing anhydrous stannic chlorid from a detinning tank, which consists in pasing chlorin through the detinned scrap and replacing the chlorin in turn by air from which the oxygen has been removed.

In witness whereof, we have hereunto signed our names in the presence of two subscribing witnesses.

FRANZ VON KÜGELGEN.
    GEORGE O. SEWARD.

Witnesses:
    GEO. T. LANCASTER,
    FR. V. KIDDER.